United States Patent
Kuyama et al.

(10) Patent No.: US 7,466,050 B2
(45) Date of Patent: Dec. 16, 2008

(54) BRUSHLESS MOTOR AND METHOD OF MANUFACTURING THE SAME

(75) Inventors: Koji Kuyama, Yonago (JP); Kumio Masuda, Yonago (JP); Kinjiro Okinaga, Yonago (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 11/235,236

(22) Filed: Sep. 27, 2005

(65) Prior Publication Data

US 2006/0087184 A1   Apr. 27, 2006

(30) Foreign Application Priority Data

Oct. 25, 2004   (JP) .............................. 2004-308972

(51) Int. Cl.
*H02K 5/16* (2006.01)
(52) U.S. Cl. ..................................................... 310/90
(58) Field of Classification Search .................. 310/90, 310/90.5
See application file for complete search history.

(56) References Cited

U.S. PATENT DOCUMENTS 5,998,898 A * 12/1999 Fukutani et al. ............. 310/90
7,109,620 B2 * 9/2006 Fujii et al. .................. 310/90
2005/0104464 A1 * 5/2005 Fujii et al. .................. 310/90

FOREIGN PATENT DOCUMENTS

| CN | 1209677 A | 3/1999 |
|----|-----------|--------|
| CN | 1453481 A | 11/2003 |
| JP | 11-210753 | 8/1999 |
| JP | 2001 124057 | 5/2001 |
| JP | 2003 239949 | 8/2003 |
| JP | 2003-314555 | * 11/2003 |
| JP | 2003-336636 | 11/2003 |

* cited by examiner

*Primary Examiner*—Nguyen N Hanh
(74) *Attorney, Agent, or Firm*—Steptoe & Johnson LLP

(57) ABSTRACT

Fluid bearing mechanisms (6a and 6b) are formed between a shaft (2) and a central part (21) of an oil impregnated sintered sleeve (13). The oil impregnated sintered sleeve (13) has such an inner surface formed to be larger in aperture ratio at a thrust support end (23) and a loading end (22) than at a central part (21). With this configuration, it is possible to achieve a brushless motor which can suppress an increase in bearing loss while obtaining necessary bearing stiffness at high rpm.

10 Claims, 6 Drawing Sheets

F I G. 2
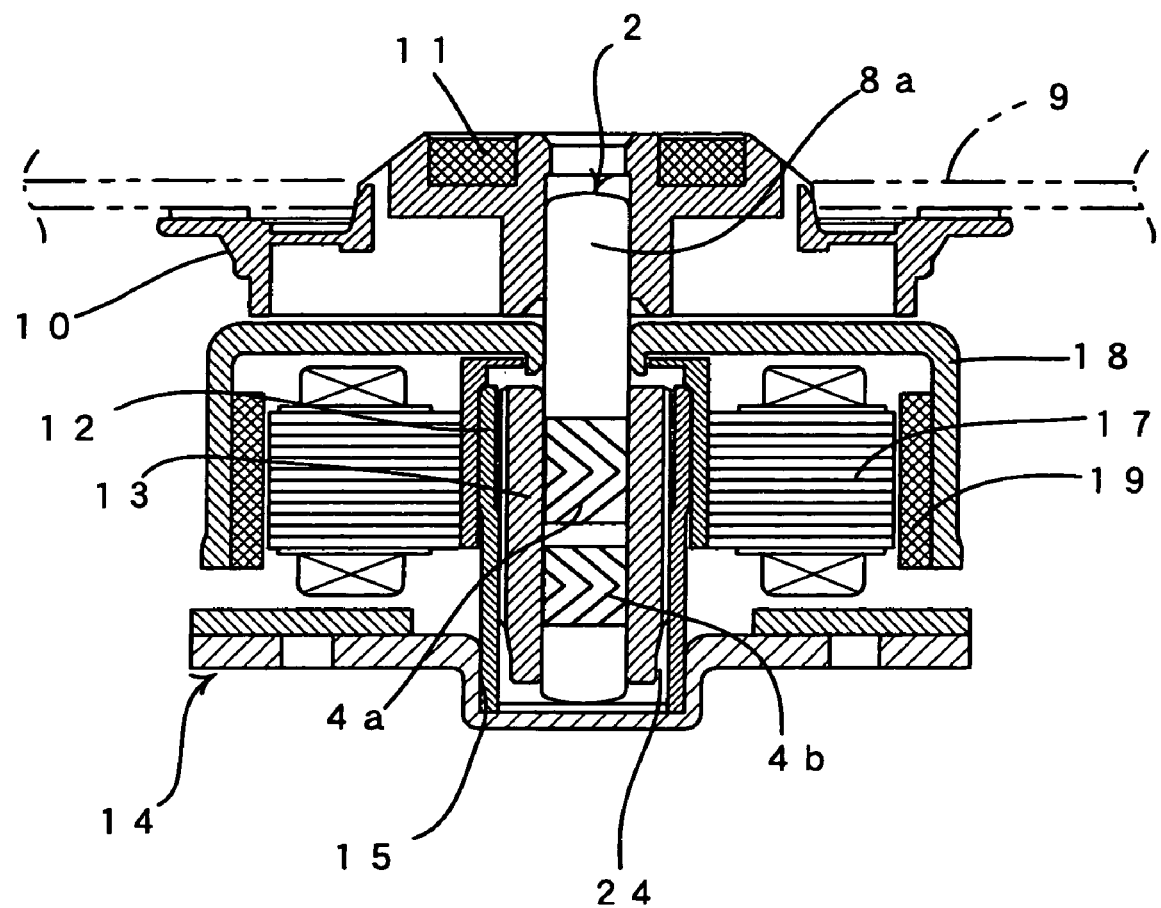

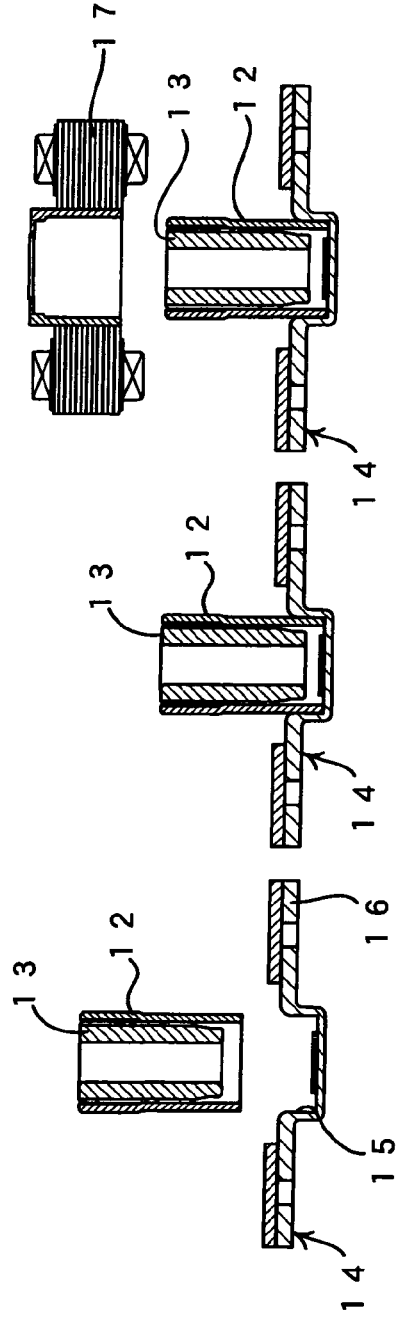

HIGH-SPEED ROTATION

LOW-SPEED ROTATION

US 7,466,050 B2

BRUSHLESS MOTOR AND METHOD OF MANUFACTURING THE SAME

The present application claims priority to Japanese Application No. 2004-308972, filed Oct. 25, 2004, which application is incorporated herein by reference in its entirety.

FIELD OF THE INVENTION

The present invention relates to a brushless motor used for driving a disk recording medium which requires changing a rotation speed over a wide range.

BACKGROUND OF THE INVENTION

Conventionally the internal bearing of a brushless motor includes:
a ball bearing having a shaft supported by a ball bearing
a plain bearing having a shaft supported via the sleeve of a sintered metal
a dynamic pressure oil bearing known as a fluid bearing
Brushless motors having dynamic pressure oil bearings are used in latest drives which rotate disk recording mediums at high speed.
Japanese Patent Laid-Open No. 2003-239949 discloses a spindle motor for driving a hard disk. In the spindle motor, a porous material (oilless bearing) for containing lubricating oil is used for a sleeve and a groove for a dynamic pressure is formed on a shaft.
Further, Japanese Patent Laid-Open No. 2001-124057 discloses a motor constituted of a dynamic pressure fluid bearing in which an oilless bearing is used for a sleeve and a herringbone groove is formed on a shaft on the output side of the sleeve.
Japanese Utility Model Laid-Open No. 59-164822 discloses a so-called hybrid bearing which is constituted of an oilless bearing made of a sintered porous material, so that a merit of a hydrodynamic bearing and a merit of an oilless bearing are obtained. In this configuration, a groove for generating a dynamic pressure is formed on the sintered porous material constituting the bearing, and crushing porous surface is performed on the bottom and sides of the groove for generating a dynamic pressure in order to support a dynamic pressure. Crushing porous surface is not performed on a part other than the groove for generating a dynamic pressure.
In order to solve the problem of Japanese Utility Model Laid-Open No. 59-164822, Japanese Patent Laid-Open No. 10-196646 discloses a hydrodynamic bearing device which preferably obtains both of an oilless bearing function and a dynamic pressure bearing function over the long term. In the configuration of Japanese Utility Model Laid-Open No. 59-164822, crushing porous surface is not performed on a part other than the groove for generating a dynamic pressure, so that a dynamic pressure of several to ten atmospheres presses lubricating oil in the bearing to the outside through sintered holes and the dynamic pressure of the bearing tends to gradually decrease. When bubbles occurs in the bearing or bubbles expand due to a temperature rise or a pressure reduction, bubbles compressed by a dynamic pressure easily enter the sintered holes and increase the leakage of lubricating oil from the oilless bearing. For this reason, in Japanese Patent Laid-Open No. 10-196646, the part of bearing for generating a dynamic pressure is larger in capillary force than the sintered hole of an oil impregnated sintered bearing.
Japanese Patent No. 3441695 and others disclose techniques of forming a dense part and a rough part with different aperture ratios inside an oilless bearing (the above-described sleeve)

Motors with so-called hybrid bearing structures are disclosed in Japanese Patent Laid-Open No. 2003-239949, Japanese Patent Laid-Open No. 2001-124057, Japanese Utility Model Laid-Open No. 59-164822, and Japanese Patent Laid-Open No. 10-196646. The motor uses an internal bearing formed by combining a shaft having a groove for generating a dynamic pressure and an oilless bearing. Such motors are suitable for high-speed and constant-speed operations but are not suitable for uses in changing a rotation speed over a wide range due to frequent start and stop of high-speed and constant-speed operations. Thus, it is quite difficult to design dynamic pressure fluid bearings.

As disclosed in Japanese Utility Model Laid-Open No. 59-164822 or Japanese Patent Laid-Open No. 10-196646, when the groove for a dynamic pressure is formed on the inner surface of the sleeve made of a porous material to increase the dynamic pressure of a lubricating fluid of a radial bearing, the dimensions and shape of the sleeve are limited by the worked surface of the groove for a dynamic pressure. Thus, such a configuration is not preferable. Particularly in the hybrid bearing of Japanese Patent Laid-Open No. 10-196646, working is necessary to make the part of bearing for generating a dynamic pressure larger in capillary force than the sintered hole of the oil impregnated sintered bearing, thereby increasing restrictions. Since the groove for a dynamic pressure on the inner surface of the sleeve is made of a porous material, it is necessary to consider durability and workability for an inspection and a test of the groove for a dynamic pressure because the groove is disposed on the inner surface of the sleeve.

As disclosed in Japanese Patent Laid-Open No. 2003-239949 and Japanese Patent Laid-Open No. 2001-124057, when the groove for a dynamic pressure is formed on the outer surface of the shaft, it is possible to solve the problem of Japanese Patent Laid-Open No. 2003-239949 or Japanese Patent Laid-Open No. 2001-124057, in which the groove for a dynamic pressure is disposed on the sleeve of a porous material. However, the brushless motor which requires changing a rotation speed over a wide range faces another problem. To be specific, as shown in FIG. 6A, in the dynamic pressure fluid bearing, a gap 3 is formed between a sleeve 1 and a shaft 2, herringbone grooves 4a and 4b are formed on the shaft 2, the gap 3 is filled with lubricating oil 5, the lubricating oil 5 flowing through the herringbone grooves 4a and 4b gathers between the herringbone grooves 4a and 4b and the inner surface of the sleeve 1 due to the high-speed rotation of the shaft 2 and constitutes fluid bearing mechanisms 6a and 6b, the shaft 2 is supported and rotated while being kept from contact with the inner surface of the sleeve 1 to ensure good performance of the bearing during high speed rotation. However, at low rpm during start-and-stop operations, as shown in FIG. 6B, the shaft 2 oscillates with respect to the sleeve 1. The oscillation brings the shaft 2 into contact with ends 7a and 7b of the sleeve 1 and degrades low-speed performance. In addition, the sleeve may be worn and cause seizing.

Particularly in the case of Japanese Patent Laid-Open No. 2001-124057, since the herringbone groove is formed on the output end of the shaft, it is necessary to fill sintered holes on the inner surface of the sleeve facing the herringbone groove to prevent lubricating oil from being pressed back into the sleeve, so that the function of the oilless bearing is lost. Hence, after start-and-stop operations are repeated, the sleeve facing the herringbone groove is like to wear and cannot stand many hours of operation.

DISCLOSURE OF THE INVENTION

An object of the present invention is to provide a reliable brushless motor for use when a rotation speed changes over a wide range during frequent start-and-stop operations, and a method of manufacturing the same, which brushless motor can obtain bearing stiffness necessary for high-speed rotation and stand many hours of operation while suppressing an increase in bearing loss.

In a brushless motor of the present invention, support is provided in the radial direction via an oil impregnated sintered sleeve from the vicinity of the thrust supporting end of the shaft to the vicinity of the loading end of the shaft where a driven target is attached, the motor is rotationally driven by electromagnetic attraction and repulsion between a stator and the magnet of a rotor connected to the shaft, and a fluid bearing mechanism is formed between the shaft and the oil impregnated sintered sleeve. The fluid bearing mechanism is formed between the oil impregnated sintered sleeve and the shaft at central part in axial direction, and the inner surfaces of the oil impregnated sintered sleeve at the thrust supporting end and the loading end are larger in aperture ratio than the inner surface at the central part.

To be specific, the brushless motor comprises a turntable for mounting and holding a disk, a shaft fixed to the center of the turntable, a frame fixed to the center of the shaft, a cylindrical rotor magnet which is fixed to the inner surface of the frame and is subjected to multi pole magnetization along the circumferential direction, a bracket having a holding portion for holding a cylindrical bearing housing and a mounting base for mounting the motor, an oil impregnated sintered sleeve which is fixed inside the bearing housing and supports the shaft in the radial direction, and a stator which faces the rotor magnet and has a conductor wound via an insulator. The oil impregnated sintered sleeve is formed with rough parts having a large aperture ratio on an inner surface thereof near the end face of the loading end where the turntable of the oil impregnated sintered sleeve is attached and on an inner surface thereof near the opposite end face, both the inner surfaces facing the shaft, and a dense part having a small aperture ratio is formed on an inner surface of the oil impregnated sintered sleeve between the rough parts. And a dynamic pressure generating groove is formed on a surface of the shaft, the surface facing the dense part of the oil impregnated sintered sleeve.

With this configuration, the motor acts as an oilless bearing at low rpm and as a hydrodynamic bearing at high rpm. Thus, it is possible to suppress an increase in bearing loss while obtaining necessary bearing stiffness at high rpm. This configuration is suitable for a motor for driving an optical disk changing in rotation speed over a wide range during repeated start-and-stop operations.

BRIEF DESCRIPTION OF THE DRAWINGS

FIG. 2 is a sectional view of the brushless motor according to the embodiment;

FIGS. 4A to 4F show the overall manufacturing process according to the embodiment;

DESCRIPTION OF THE EMBODIMENT

Figure 1:
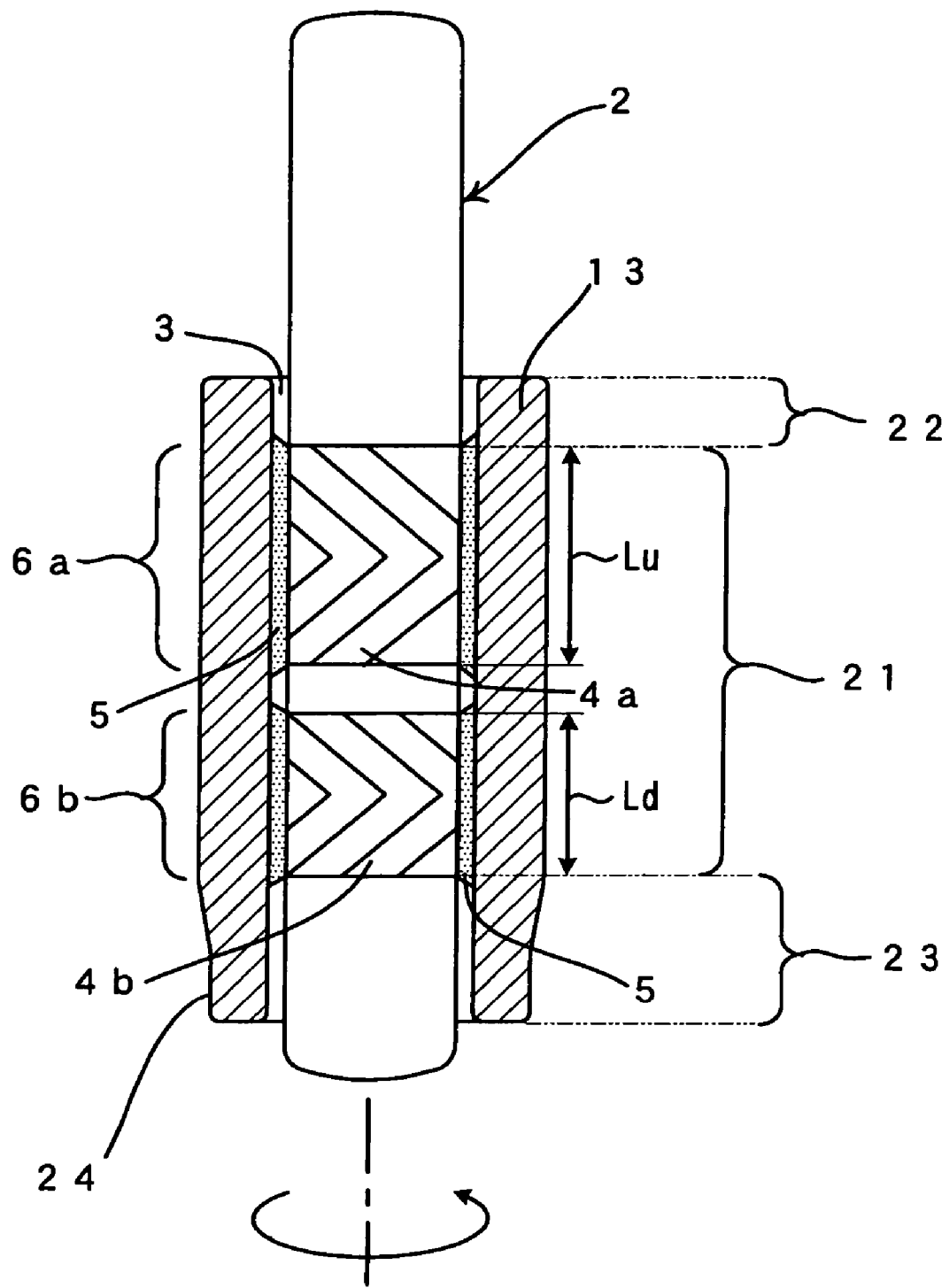
FIG. 1 is a sectional view of a main part of an internal bearing of a brushless motor according to an embodiment of the present invention.

Referring to an embodiment shown in FIGS. 1 to 5, a brushless motor of the present invention will be described below.

FIG. 2 shows the brushless motor of the present invention. A turntable 10 for holding a disk recording medium 9 is attached to a loading end 8a of a shaft 2. A clamper is not illustrated which is attracted to a magnet 11 on the turntable 10 such that the disk recording medium 9 is integrally interposed between the clamper and the turntable 10.

The brushless motor is assembled in the steps of FIGS. 3A and 3B and FIGS. 4A to 4F. The brushless motor uses an internal bearing formed by combining the shaft 2, on which herringbone grooves 4a and 4b are formed as dynamic pressure generating grooves, and an oilless bearing.

Figure 3A:
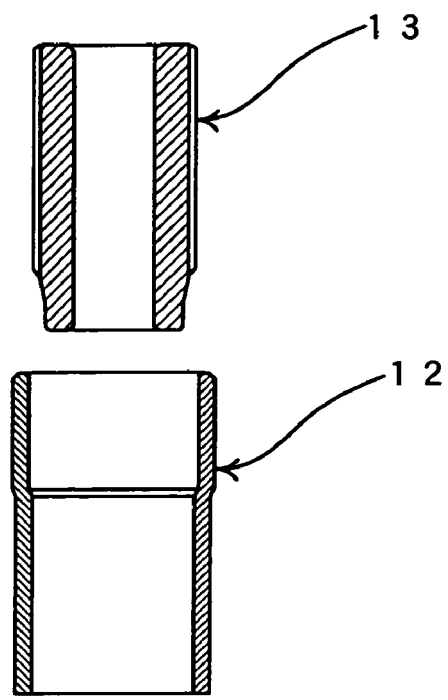
FIGS. 3A and 3B respectively shows a manufacturing process how an oil impregnated sintered sleeve is press fit into a bearing housing, according to the embodiment.
Figure 3B:
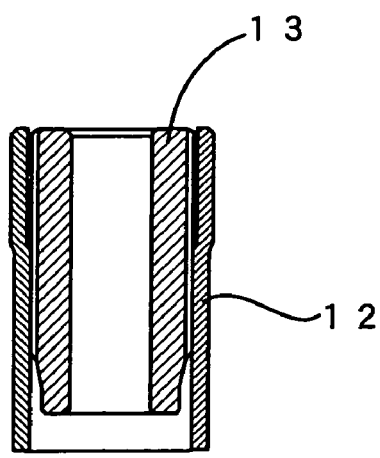

First, as shown in FIGS. 3A and 3B, an oil impregnated sintered sleeve 13 is press fit into a cylindrical bearing housing 12.

Then, as shown in FIGS. 4A and 4B, the bearing housing 12 having been assembled as FIGS. 3A and 3B is press fit into a holding portion 15 of a bracket 14. Reference numeral 16 denotes a mounting base for mounting a motor.

In FIGS. 4C and 4D, a stator 17 where a conductor is wound via an insulator is press fit onto the bearing housing 12.

In FIGS. 4E and 4F, the shaft 2 having a cup-like rotor frame 18 is inserted into the oil impregnated sintered sleeve 13. A ring-shaped magnet 19 facing the stator 17 is attached to the inner surface of the rotor frame 18. The inner surface of the magnet 19 is magnetized with a predetermined pitch.

In this way, the shaft 2 is supported in the radial direction by the oil impregnated sintered sleeve 13 which is fixed in the bearing housing 12.

Prior to the explanation of an aperture ratio on the inner surface of the oil impregnated sintered sleeve 13, the following will discuss the reason why a dynamic pressure bearing is not suitable for use in changing a rotation speed over a wide range.

Originally a hydrodynamic bearing has to be designed according to a rotation speed and a load, and thus it is quite difficult to design the dynamic pressure fluid bearing of a spindle motor for driving an optical disk, which changes in rotation speed over a wide range.

Figure 5A:
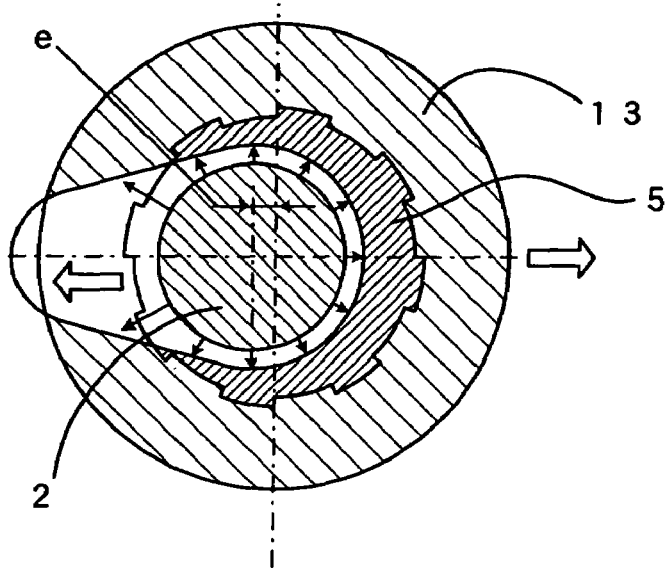
FIGS. 5A and 5B respectively illustrate the principle of a fluid bearing.
Figure 5B:
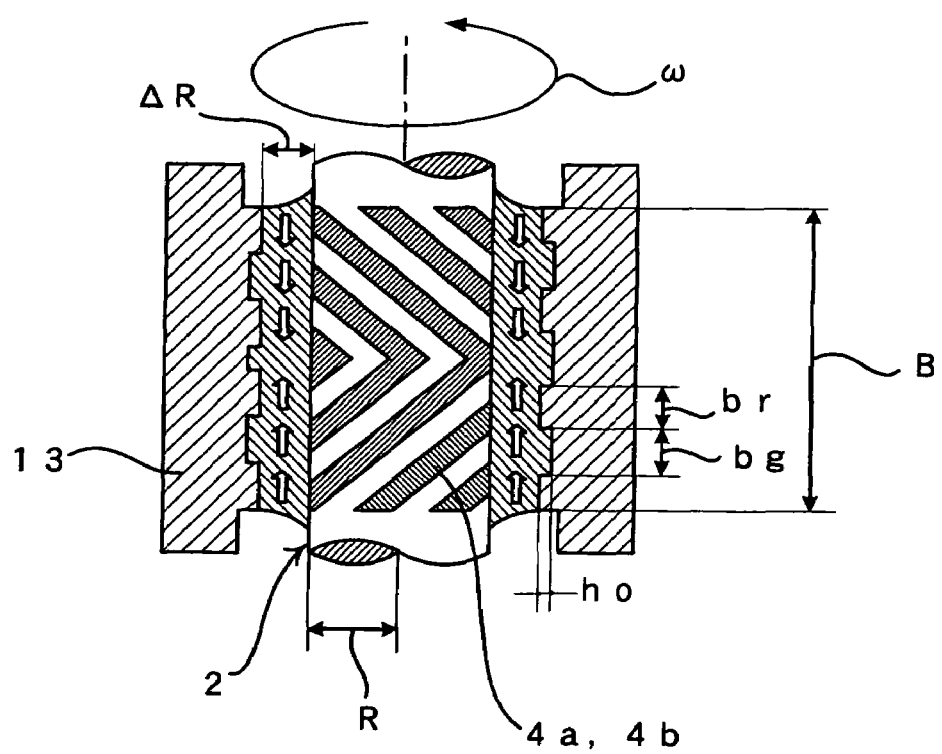
Figure 6A:
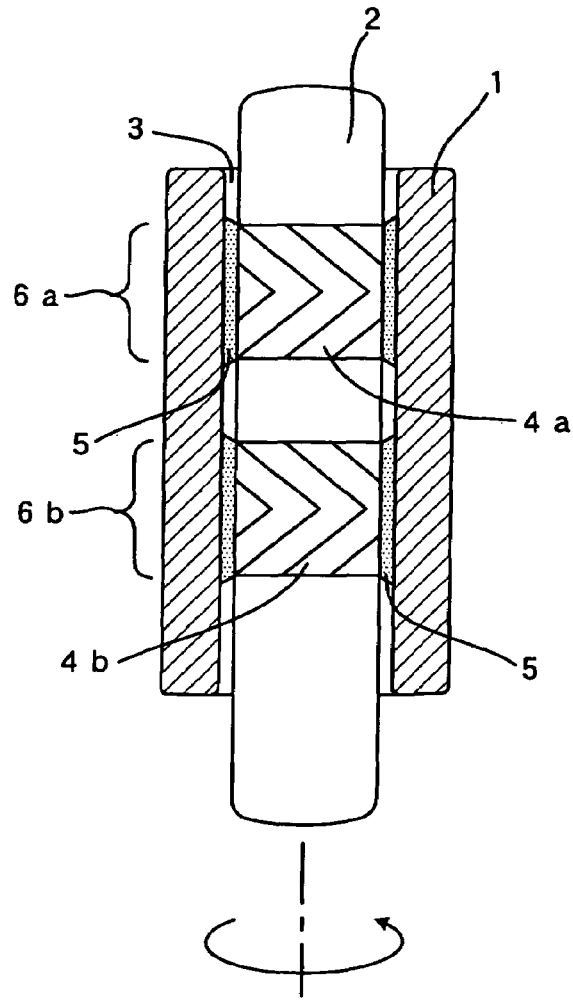
FIGS. 6A and 6B illustrate operations of a conventional hybrid bearing, respectively at high rpm and at low rpm.
Figure 6B:
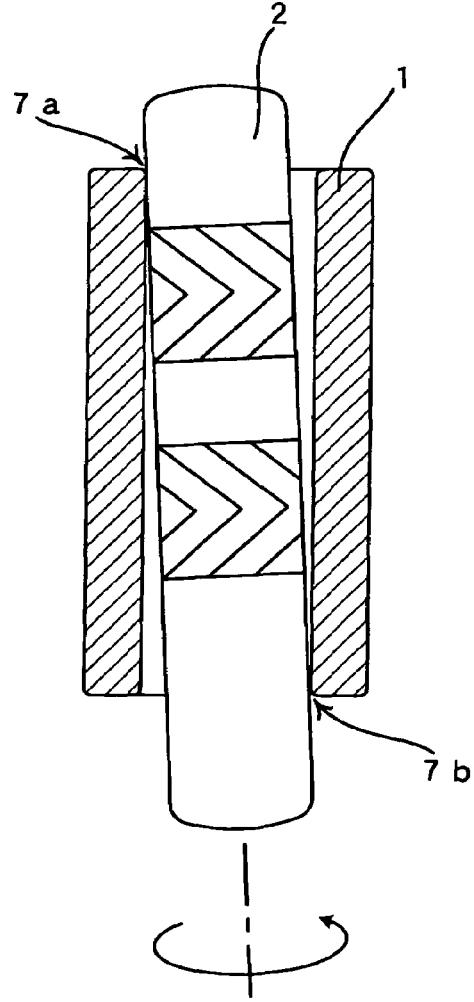

The following are relational expressions of a bearing load capacity P associated with the stiffness of the bearing, a bearing friction torque M associated with a bearing loss, the dimensions of the constituent elements of the bearing, and a rotation speed. The load capacity P and the bearing friction torque M of the shaft are expressed by the expressions below including the following factors. FIGS. 5A and 5B show the principle of the fluid bearing.

Bearing load capacity: $P = fr \cdot \upsilon \cdot \omega \cdot R2 \cdot B2 \cdot e / \Delta R3$ Bearing friction torque: $M = 2 \cdot \pi \cdot \upsilon \cdot \omega \cdot R3 \cdot B / Cr$ $Cr = \Delta R \cdot (1-\alpha) + (\Delta R + ho) \cdot \alpha$ Groove width ratio: $\alpha = (bg/bg+br)$ where fr represents a function determined by a groove shape and so on, $\upsilon$ represents the viscosity of lubricating oil, $\omega$ represents an angular speed, R represents the radius of the shaft, B represents the length of the bearing, e represents the amount of eccentricity, $\Delta R$ represents a radius gap between the shaft and the bearing sleeve, ho represents the depth of the groove, bg represents a groove width, and br represents a ridge width.

The bearing load P1 of a body of revolution is expressed by $P1 = m \cdot r \cdot \omega 2$ where m represents the balance mass of the body of revolution, r represents a balance radius, and ω represents an angular speed.

Since the bearing load capacity P has to be equal to or larger than the maximum value of the bearing load P1 resulted from imbalance, design dimensions have to be determined so as to establish the expression below:

$$P = fr \cdot v \cdot \omega \cdot R2 \cdot B2 \cdot e / \Delta R3 \geq P1 = m \cdot r \cdot \omega 2$$

According to the above expression, the bearing stiffness (P/e) affects at the cube of a radius gap between the shaft and the bearing sleeve and the square of a bearing length.

In this case, the bearing load capacity P affecting the current consumption and life of the motor and the bearing loss resulted from the bearing friction torque M are determined by the radius gap ΔR, the bearing length B, and the viscosity σ of lubricating oil. As the number of revolutions increases, the capacity P and the bearing loss rapidly increase with a motor load including the inertia and the amount of imbalance of the body of revolution. Particularly the amount of imbalance affects at the square of the number of revolutions as expressed in the relational expression of the bearing load P1, thereby exerting quite a large influence. Therefore, it is important to reduce a bearing loss while increasing the load capacity P of the bearing. Meanwhile, the bearing loss capacity P and the bearing torque have the relationship of M∝P·n (n represents a constant determined by a groove shape, lubricating oil, and so on). Since the bearing load capacity and the bearing friction torque are proportionate to each other, it is necessary to design a groove and select or develop oil according to a rotation speed in consideration of the balance of the bearing stiffness and the bearing loss that can satisfy performance at the maximum imbalance or less. Thus, the dynamic pressure bearing is not suitable for use in changing a rotation speed over a wide range.

In the dynamic pressure fluid bearing of the spindle motor for driving an optical disk, according to the relational expressions, it is necessary to increase the bearing stiffness because a load increases due to the imbalance of the optical disk at high rpm. At low rpm, a load caused by the imbalance of the optical disk decreases but a generated dynamic pressure also becomes smaller, resulting in lower bearing stiffness.

The bearing stiffness at low rpm can be increased by a larger shaft diameter, a longer bearing, a smaller gap 3 between the sleeve 13 and the shaft 2, and a higher viscosity of lubricant oil 5. However, the loss of the bearing increases at the same time. The loss considerably increases especially at high rpm. The bearing stiffness increases in proportion to the rotation speed. A load caused by the imbalance of the disk increases in proportion to the square of the rotation speed.

Therefore, a load caused by the imbalance of the disk decreases more than the bearing stiffness at low rpm and thus high bearing stiffness is not necessary.

With the configuration of the present invention which acts as an oilless bearing at low rpm and a hydrodynamic bearing at high rpm, it is possible to achieve a brushless motor for driving an optical disk that comprises an excellent bearing for suppressing an increase in bearing loss while obtaining necessary bearing stiffness at high rpm.

The inner surface of the oil impregnated sintered sleeve 13 has an aperture ratio obtained by the following working: as shown in FIG. 1, in a central part 21 of the oil impregnated sintered sleeve 13, the herringbone grooves 4a and 4b formed on the shaft 2 constitute fluid bearing mechanisms 6a and 6b.

The herringbone grooves 4a and 4b are formed to be elongate from the center of the axial direction of the oil impregnated sintered sleeve 13 to a loading end 22. To be specific, a length Lu of the herringbone groove 4a is larger than a length Ld of the herringbone groove 4b with respect to the axial direction of the oil impregnated sintered sleeve 13.

When a comparison is made between the inner surface of the central part 21 of the oil impregnated sintered sleeve 13 and inner surfaces of a thrust support end 23 and the loading end 22, the inner surface of the central part 21 of the oil impregnated sintered sleeve 13 is filled to be formed into a dense part of a low aperture ratio with the minimum number of holes in order to achieve preferred operations of the fluid bearing mechanisms 6a and 6b. The inner surfaces of the thrust support end 23 and the loading end 22 are formed into rough parts which are larger in aperture ratio than the central part 21 of the oil impregnated sintered sleeve 13.

The aperture ratio is a ratio of holes (porus) in the unit area of the oil impregnated sintered sleeve 13.

To be specific, when a comparison is made between the thrust support end 23 and the loading end 22, the loading end 22 is smaller in aperture ratio than the thrust support end 23.

The inner surface of the oil impregnated sintered sleeve 13 can be worked by a known working method such as the conventional art of Japanese Patent No. 3441695. In the case where the dense part and the rough parts are worked before the oil impregnated sintered sleeve 13 is press fit into the bearing housing 12, a prepared state on the inner surface of the oil impregnated sintered sleeve 13 may change and degrade performance. Thus, instead of working on the oil impregnated sintered sleeve 13 separately, it is desirable to work the dense part and the rough parts while the oil impregnated sintered sleeve 13 is press fit into the bearing housing 12 as shown in FIG. 3B. In the case where each of the oil impregnated sintered sleeve 13 and the bearing housing 12 has high accuracy and the aperture ratios of the inner surfaces can be accurately managed when the oil impregnated sintered sleeve 13 is press fit into the bearing housing 12, the inner surface of the oil impregnated sintered sleeve 13 can be worked separately.

In the present embodiment, the bearing housing 12 of FIG. 3B, in which the inner surface of the oil impregnated sintered sleeve 13 has been worked, is press fit into the holding portion 15 of the bracket 14 as shown in FIG. 4B. In this process, in order to prevent a change of the prepared state on the inner surface of the oil impregnated sintered sleeve 13, a small-diameter portion 24 is formed beforehand on the end of the oil impregnated sintered sleeve 13 as shown in FIGS. 2 and 3B in such a manner as to prevent a contact with a deformed portion and a compressive force while the bearing housing 12 is press fit into the holding portion 15 of the bracket 14.

In the brushless motor configured thus, the dense part of the central part 21 of the oil impregnated sintered sleeve 13 and the herringbone grooves 4a and 4b formed on the shaft 2 can constitute the preferred fluid bearing mechanisms 6a and 6b, thereby achieving preferably high-speed rotation. As described above, the inner surface of the oil impregnated sintered sleeve 13 is uneven such that the rough parts are formed on both ends of the dense part of the central part 21 of the oil impregnated sintered sleeve 13. Thus, it is possible to achieve a brushless motor in which even when the shaft 2 comes into contact with the ends 7a and 7b of the oil impregnated sintered sleeve 13 at low rpm during start-and-stop operations, lubricating oil seeps through the oil impregnated sintered sleeve 13 to provide lubrication, an increase in bearing loss is suppressed at low rpm, and excellent high-speed rotation and low-speed rotation can be obtained.

The rough part of the loading end 22, on which a larger force is applied as compared with the thrust support end 23, is smaller in aperture ratio than the thrust support end 23. Thus, proper control can be achieved so as to prevent an oil film from being lost on a contact surface of the shaft 2 when oil seeping from the end 7a of the oil impregnated sintered sleeve 13 is pressed into the opening of the oil impregnated sintered sleeve 13 again by the contact of the shaft 2. Further, an increase in bearing loss or seizing caused by a metal contact can be suppressed for a long time.

Particularly in the motor for driving various optical disks such as a CD-ROM, a CD-R, a CD-RW, a DVD-ROM, and a DVD-R, the load of the disk is considerably unbalanced and the motor is frequently started and stopped. Thus, such a motor is a preferred application of the present invention.

In this embodiment, the herringbone grooves 4a and 4b are formed on the shaft 2 as grooves for generating a dynamic pressure. The grooves for generating a dynamic pressure are not particularly limited and a spiral groove or the like may be formed.

The brushless motor of the present invention is suitable for a motor for driving disk recording mediums such as an optical disk and can contribute to stable operations of various drives.

What is claimed is:

1. A brushless motor comprising:
   a bracket,
   a shaft having a thrust support end and a loading end, the thrust support end connected to said bracket; and
   an oil impregnated sintered sleeve for radially supporting said shaft, said oil impregnated sintered sleeve having an inner surface larger in aperture ratio at the thrust support end and the loading end than at a central part of the oil impregnated sintered sleeve,
   wherein a gap between the shaft and oil impregnated sintered sleeve is for retaining a fluid,
   the shaft comprises a dynamic pressure generating groove on a surface facing the central part of the oil impregnated sintered sleeve, and
   the brushless motor further comprises a magnet connected to the shaft and a stator connected to the bracket for rotationally driving the motor.

2. The brushless motor according to claim 1, wherein the dynamic pressure generating groove extends from a surface opposite the central part of the oil impregnated sintered sleeve to the loading end of the shaft.

3. The brushless motor according to claim 1, wherein the inner surface of the oil impregnated sintered sleeve facing the shaft at the loading end is smaller in aperture ratio than the inner surface facing the shaft at the thrust support end of the shaft.

4. The brushless motor according to claim 1, wherein the dynamic pressure generating groove extends from a surface opposite the central part of the oil impregnated sintered sleeve to the loading end of the shaft, and a gap is formed between an outer surface of the oil impregnated sintered sleeve and an inner surface of the bearing housing.

5. The brushless motor according to claim 1, wherein the inner surface facing the shaft near the end face of the loading end of the oil impregnated sintered sleeve is smaller in aperture ratio than the inner surface facing the shaft near the opposite end face, and a gap is formed between an outer surface of the oil impregnated sintered sleeve and an inner surface of the bearing housing, the gap opposing a position where the bearing housing is held in the holding portion of the bracket.

6. A brushless motor according to claim 1, further comprising a rough part and a dense part in a surface of said oil impregnated sintered sleeve,
   wherein said rough and dense parts are formed in said oil impregnated sintered sleeve after the oil impregnated sintered sleeve is press fit and fixed into a bearing housing.

7. A brushless motor, comprising:
   a shaft having a thrust support end, a loading end, and at least one dynamic pressure generating groove in a surface of the shaft;
   an oil impregnated sintered sleeve for supporting the shaft in a radial direction, said oil impregnated sintered sleeve having rough parts with a large aperture ratio on an inner surface at the loading end of the shaft and the thrust support end of the shaft, and having a dense part with a small aperture ratio on an inner surface between the rough parts, said dense part facing said dynamic pressure generating groove of the shaft;
   a cylindrical bearing housing for supporting the oil impregnated sintered sleeve in a radial direction;
   a turntable mounted to said loading end of the shaft for holding a disk;
   a frame fixed to said shaft;
   a cylindrical rotor magnet fixed to an inner surface of the frame;
   a bracket having a holding portion for holding said cylindrical bearing housing; and
   a stator facing the rotor magnet and having a conductor wound via an insulator, said stator being connected to said cylindrical bearing housing and fixed with respect to said bracket.

8. The brushless motor according to claim 7, further comprising a gap between an outer surface of the oil impregnated sintered sleeve and an inner surface of the bearing housing.

9. An dynamic pressure oil bearing in which support is provided in a radial direction, via an oil impregnated sintered sleeve, from a vicinity of a thrust support end of a shaft to a vicinity of a loading end of the shaft where a driven target is attached, a motor is rotationally driven by electromagnetic attraction and repulsion between a stator and a magnet of a rotor connected to the shaft, arid a fluid bearing mechanism is formed between the shaft and the oil impregnated sintered sleeve, wherein
   the fluid bearing mechanism is formed between the oil impregnated sintered sleeve and the shaft at central part in axial direction, and
   the oil impregnated sintered sleeve has an inner surface formed to be larger in aperture ratio at the thrust support end and the loading end than at the central part of the oil impregnated sintered sleeve.

10. The dynamic pressure oil bearing according to claim 9, wherein the fluid bearing mechanism has a dynamic pressure generating groove formed on a surface of the shaft, the surface facing the central part of the oil impregnated sintered sleeve.

* * * * *